(12) United States Patent
Greeff

(10) Patent No.: US 8,045,356 B2
(45) Date of Patent: Oct. 25, 2011

(54) MEMORY MODULES HAVING DAISY CHAIN WIRING CONFIGURATIONS AND FILTERS

(75) Inventor: Roy Greeff, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 322 days.

(21) Appl. No.: 12/395,340

(22) Filed: Feb. 27, 2009

(65) Prior Publication Data

US 2010/0223406 A1    Sep. 2, 2010

(51) Int. Cl.
*G11C 5/06* (2006.01)
(52) U.S. Cl. ...... 365/63; 365/191; 365/138; 365/233.11
(58) Field of Classification Search ............... 365/63, 365/191, 138, 233.11
See application file for complete search history.

(56) References Cited

U.S. PATENT DOCUMENTS

| | | | |
|---|---|---|---|
| 6,125,419 A | 9/2000 | Umemura et al. | 710/129 |
| 6,515,555 B2 | 2/2003 | Leddige et al. | 333/34 |
| 6,531,901 B2 | 3/2003 | Kamiya | 327/108 |
| 7,095,661 B2 | 8/2006 | Osaka et al. | 365/194 |
| 7,106,094 B2 | 9/2006 | Gamble et al. | 326/30 |
| 7,155,627 B2 | 12/2006 | Matsui | 713/401 |
| 2007/0157049 A1 | 7/2007 | Kim et al. | 713/401 |
| 2009/0063786 A1* | 3/2009 | Oh | 711/148 |

* cited by examiner

*Primary Examiner* — Thong Q Le
(74) *Attorney, Agent, or Firm* — Dorsey & Whitney LLP

(57) ABSTRACT

Examples described include memory units coupled to a controller using a daisy chain wiring configuration. A filter located between a first memory unit and the controller attenuates a particular frequency, which may improve ringback in a signal received at the memory units. In some examples, a quarter-wavelength stub is used to implement the filter. In some examples, signal components at 800 MHz may be attenuated by a stub, which may improve ringback.

21 Claims, 5 Drawing Sheets

MEMORY MODULES HAVING DAISY CHAIN WIRING CONFIGURATIONS AND FILTERS

TECHNICAL FIELD

Described examples relate generally to semiconductor memory, and particularly, to a wiring configuration for daisy chained memory units.

BACKGROUND

Computer systems may include several memory units coupled to a memory controller. The memory controller may transmit control, address, and clock signals to the memory units. In some systems, the memory units are coupled to the controller using one or more signal trees, where a conductive connector coupling the controller to the memory units branches out from the controller to each memory unit. Generally, the branches of the tree structure are split approximately equally to each memory unit to maintain a uniform amount of capacitance at each branch. However, as the tree structure gets longer to reach more memory units, more branches are added, so that the capacitance of the tree structure itself increases. The speed of signal transmission through the tree structure may be limited by the amount of capacitance presented by the structure, because a driver in the memory controller must drive the entire tree structure to transmit signals to the memory units.

Accordingly, as memory speeds increase, a daisy chain wiring configuration may be used. An example of memory units connected to a controller using a daisy chain wiring configuration is shown in FIG. 1. A controller 100 is coupled to memory units 110, 120, 130, and 140 by a daisy chain 150. The daisy chain 150 is coupled from the controller 100 to the memory units 110, 120, 130, and 140 sequentially. Address, command, and clock signals transmitted from the controller 100 may accordingly be propagated by the daisy chain to each of the memory units 110, 120, 130, and 140.

In the daisy chain configuration shown in FIG. 1, inductance and impedance are distributed in lumped elements along the daisy chain, with each of the memory units 110, 120, 130, and 140 presenting a capacitance to the daisy chain 150. Due in part to the lumped nature of the elements and the distributed load along the daisy chain 150, increased bandwidth may be achieved relative to the tree configuration described above. In some designs, the distances between the memory units 110, 120, 130, and 140 are carefully specified to improve signal quality along the daisy chain.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Figure 1:
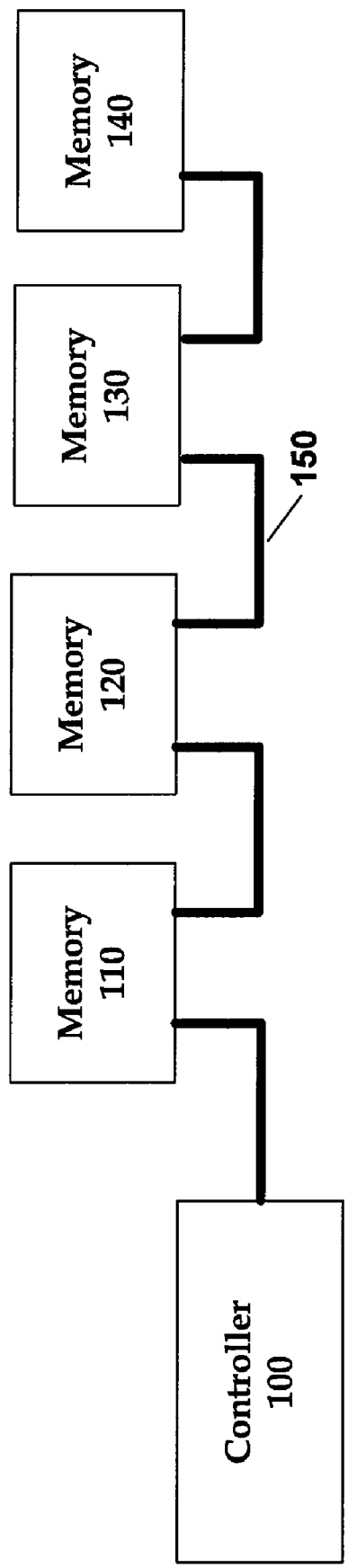
FIG. 1 is a schematic diagram of memory units coupled to a memory controller using a daisy chain wiring configuration.
Figure 2:
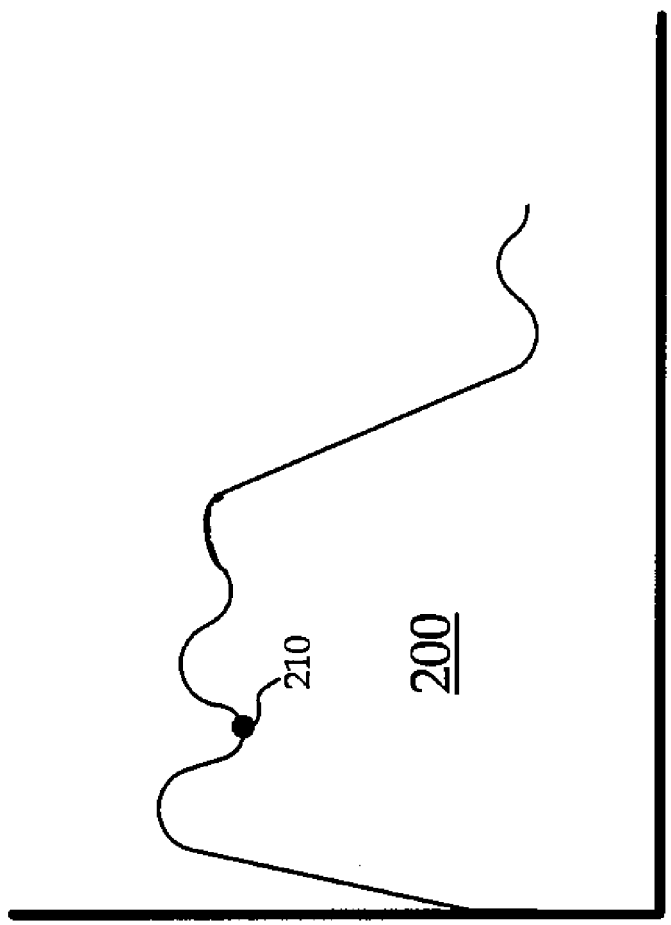
FIG. 2 is a schematic illustration of a waveform showing ringback.

Referring again to FIG. 1, memory units 110, 120, 130, an 140 may be connected in a daisy chain configuration. A phenomena known as ringback may be observed on the daisy chain 150. In particular, FIG. 2 is a schematic illustration of a waveform received at the memory unit 110 showing ringback. The signal 200 may represent a signal transition from a low to a high. However, as illustrated, the signal may not be a perfectly square transition, instead, variations may be observed in the signal. A low point 210 is indicated in FIG. 2. If the low point 210 falls too low, or falls too far away from the initial rise of the waveform, there is a danger that the memory unit 110 may inaccurately interpret the low point 210 in the waveform 200 to be a signal transition. It has been found that the ringback problem may be greatest at the first memory drop along the daisy chain—the memory unit 110 in FIG. 1, for example.

Figure 3:
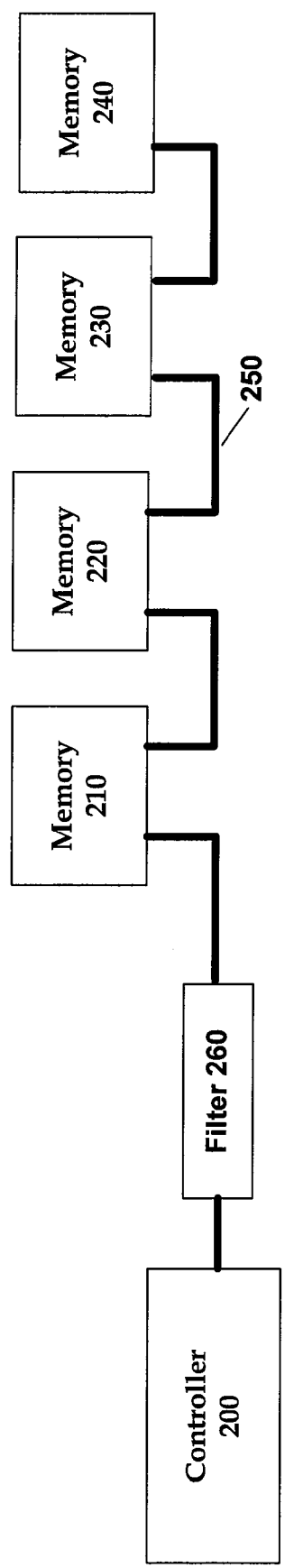
FIG. 3 is a schematic diagram of memory units coupled to a memory controller using a daisy chain wiring configuration with a filter.

FIG. 3 is a schematic diagram of memory units 210, 220, 230, and 240 coupled to a controller 200 using a daisy chain 250 wiring configuration. A filter 260 is placed between the controller 200 and the first memory unit 210. The filter may attenuate components of signals received from the controller 200 at frequencies that may contribute to the ringback problem described above. That is, by placing the filter 260 between the controller 200 and the first memory unit 210, ringback in the signal received at the first memory unit 210 may be lessened. The frequency attenuated may be selected based in part on the signal rate communicated on the daisy chain 250 and the electrical properties of the daisy chain 250, such as impedance of the daisy chain 250. In one example, the filter 260 may be used to attenuate signal components at about 800 MHz to reduce ringback in the signal. In other examples, other or different frequencies may be attenuated. By placing the filter 260 between the controller 200 and the first memory unit 210, ringback may be reduced not just in the signal received at the first memory unit 210, but also in the signals received at other memory units coupled to the daisy chain 250.

Figure 4:
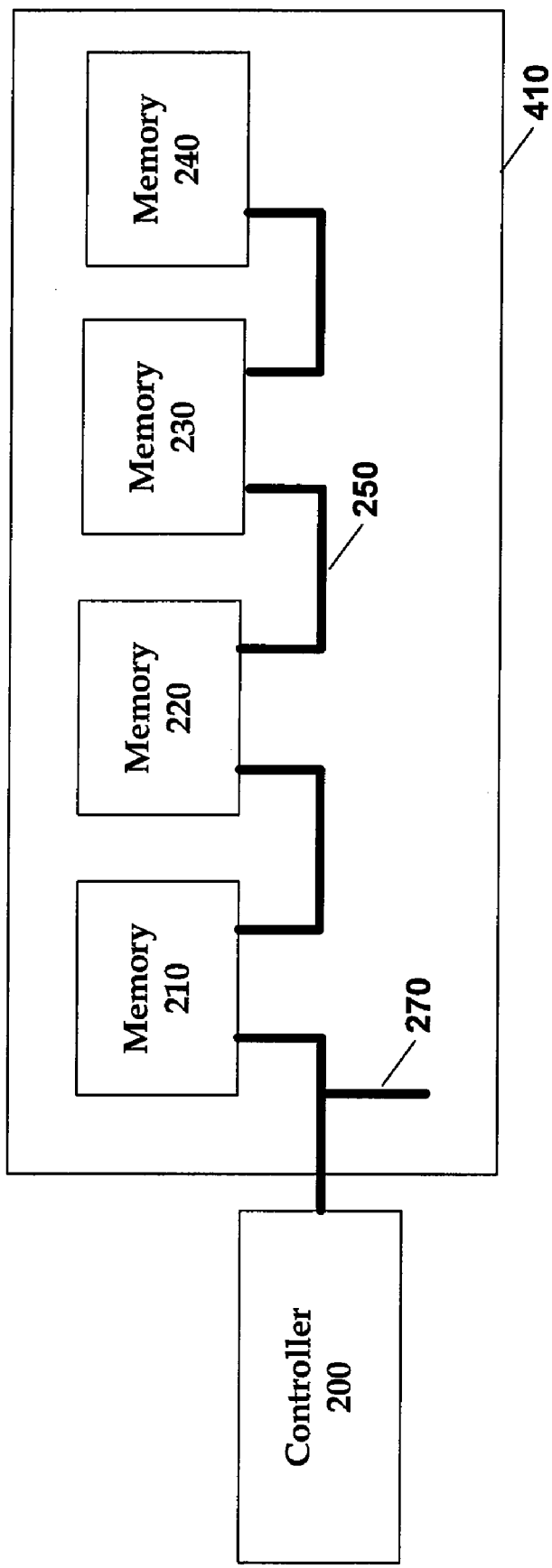
FIG. 4 is a schematic diagram of memory units coupled to a memory controller using a daisy chain wiring configuration with a stub.

FIG. 4 is a schematic diagram of the daisy chain 250 wiring configuration demonstrating an implementation of the filter 260 as a stub 270. Although any filter implementation may be used, one example is the stub 270. The stub 270 is a conductive trace connected to the daisy chain 250. A length of the stub 270 may be selected to attenuate a particular frequency. For example, the stub 270 may be a quarter-wavelength stub where the length of the stub 270 is approximately equal to ¼ of the wavelength of the frequency attenuated. The stub 270 may act as a notch filter, shorting one or more frequencies to ground due in part to the electrical properties of the stub. Although a quarter-wavelength stub may be particularly effective in attenuating frequencies at one wavelength, it may also provide some attenuation to other frequencies, as will be understood. Accordingly, to attenuate a particular frequency, such as 800 MHz, the stub 270 length may not be exactly one-quarter wavelength to be effective. In some examples, a length of anywhere between 1 to 2 inches may be sufficient to reduce ringback on the daisy chain 250. The stub 270 may have any width, but in some examples has a same width as traces used to form the daisy chain 250, which may simplify fabrication of the stub 270. In one example, the stub 270 may have a length of 47 mm and be placed 500 mils from the connection to the memory unit 210. The stub 270 may be straight, as indicated in FIG. 4, or may take substantially any shape.

The memory units 210, 220, 230, and 240 may generally be any type of memory including DRAM. The daisy chain 250 may transmit control, address, or clock signals from the controller 200 to the memory units 210, 220, 230, and 240. In some examples, the daisy chain 250 may be used to transmit more than one type of signal, while in other examples separate daisy chains may be provided to couple different signal types. Any number of memory units may generally be coupled to the daisy chain 250. The controller 200 may generally transmit signals according to any protocol, including standards applicable to DDR3 DRAM.

The memory units 210, 220, 230, and 240 may be supported by a common substrate 410 in some examples. The substrate 410 and the memory units 210, 220, 230, and 240 may form a DIMM, as understood in the art. The daisy chain 250 and the stub 270 may also be supported by the substrate 410. As generally described above, the daisy chain 250 and stub 270 may be formed from a same conductive material, and the stub may be formed at the same time as all or a portion of the daisy chain 250. In some embodiments, the controller 200 may also be supported by the substrate 410.

Figure 5:
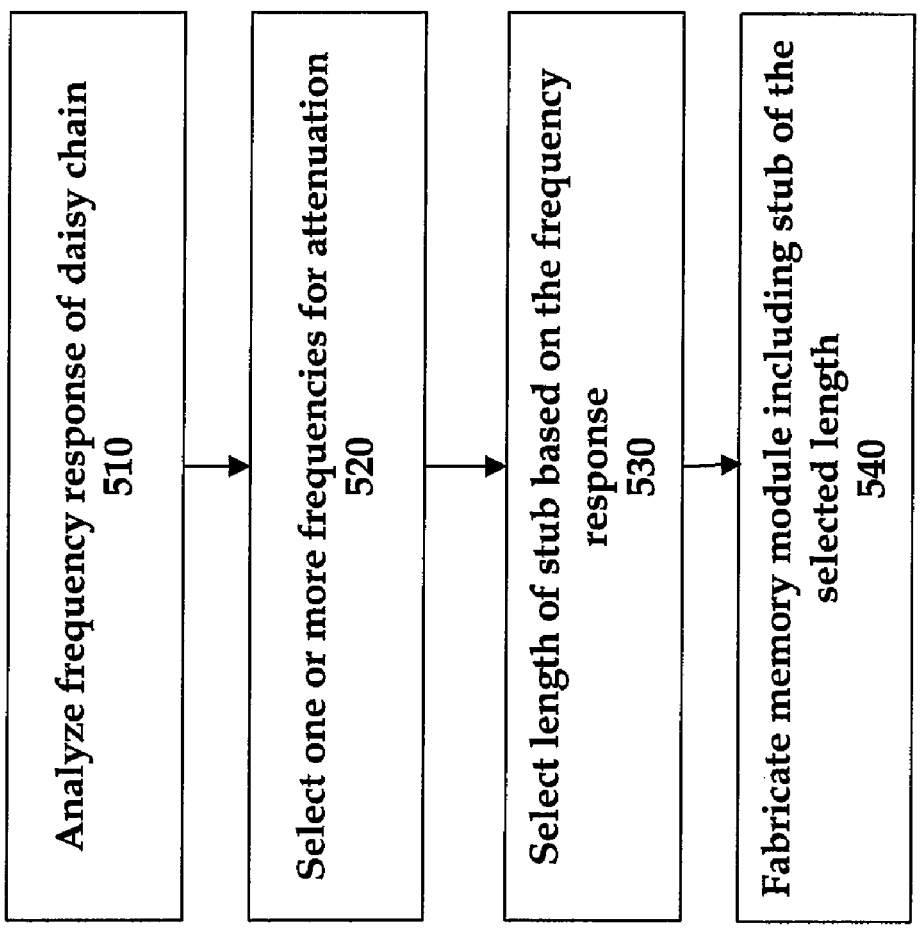
FIG. 5 is a schematic flowchart of a method for designing a memory module.

Memory modules containing daisy chained memory units may accordingly be designed with filters as described above. FIG. 5 is a schematic flowchart illustrating a design process for examples of memory modules containing a stub. A frequency response of the daisy chain may be analyzed 510. This may include simulating the frequency response of a layout of the daisy chain 250 in FIG. 4. The memory units 210, 220, 230, and 240 may present known and relatively controlled capacitances to the daisy chain 250, their effect on the frequency response may factored in to a frequency analysis. Based on the frequency response analyzed, one or more frequencies may be selected for attenuation 520. Generally, a frequency may be selected where attenuation of the frequency may improve ringback at one or more of the memory units connected to the daisy chain. For example, a frequency of around 800 MHz is selected, although any frequency may be selected, including those from 750 MHz to 1 GHz.

Based on the selected frequency or frequencies, a length of a stub may be selected 530. The length is generally selected such that the stub will attenuate the selected frequency to at least some degree. As described above, in some examples, the selected length is equal to ¼ wavelength of the selected frequency. In some examples, the stub may have a length ranging from 1 to 2 inches. Memory modules may then be fabricated 540 having daisy chains connected to stubs of the selected length. The memory modules may not yet have memory units coupled to the module.

From the foregoing it will be appreciated that, although specific embodiments of the invention have been described herein for purposes of illustration, various modifications may be made without deviating from the spirit and scope of the invention.

What is claimed is:

1. A memory module comprising:
   a plurality of memory units;
   a daisy chain coupled to each of the plurality of memory units in series including a first memory unit and configured to transmit signals to the plurality of memory units; and
   a filter coupled to the daisy chain prior to the first memory unit, the filter configured to attenuate signals at a selected frequency.

2. The memory module according to claim 1 wherein the filter is a notch filter.

3. The memory module according to claim 1 further comprising a controller configure to generate the signals transmitted to the plurality of memory units.

4. The memory module according to claim 3 wherein the filter is coupled between the first memory unit and the controller.

5. The memory module according to claim 1 wherein the selected frequency is a frequency contributing to ringback at the first memory unit.

6. The memory module according to claim 1 wherein the selected frequency is based in part on an electrical property of the daisy chain and a rate of signals transmitted by the daisy chain.

7. The memory module according to claim 1 wherein the selected frequency is based on an impedance of the daisy chain.

8. The memory module according to claim 1 wherein the selected frequency is 800 MHz.

9. The memory module according to claim 1 wherein the filter comprises a stub.

10. The memory module according to claim 9 wherein the stub is a quarter wavelength stub having a length equal to ¼ of a wavelength of the selected frequency.

11. The memory module according to claim 9 wherein the stub has a length of between 1 and 2 inches.

12. The memory module according to claim 9 wherein the stub comprises a conductive trace coupled to the daisy chain.

13. The memory module according to claim 9 wherein the stub is configured to act as a short for the selected frequency.

14. The memory module according to claim 1 wherein signals transmitted by the daisy chain include command, address, or clock signals, or combinations thereof.

15. A memory system comprising:
   an electronic device generating a signal;
   a plurality of memory units;
   a daisy chain coupling the electronic device to the plurality of memory units in series including a first memory unit; and
   a filter coupled to the daisy chain between the electronic device and the first memory unit.

16. The memory system according to claim 15 wherein the electronic device comprises a memory controller.

17. The memory system according to claim 15 wherein the filter comprises a stub.

18. The memory system according to claim 15 wherein the filter is configured to attenuate signals at a selected frequency.

19. A method of reducing ringback in a signal transmitted from an electronic device to a plurality of memory devices through a daisy chain, the memory devices including a first memory device connected directly to the electronic device, the method comprising:
   filtering the signal coupled from the electronic device to the first memory device.

20. The method according to claim 19 wherein the act of filtering comprises notch filtering at a frequency related to the ringback.

21. The method according to claim 19, wherein the act of filtering comprises attenuating signals at a selected frequency.

* * * * *